Oct. 21, 1952 A. KEPES 2,614,415
TESTING APPARATUS FOR THE MEASUREMENT OF THE
INTERNAL PHYSICAL PROPERTIES OF SOLIDS
Filed Dec. 1, 1949 4 Sheets-Sheet 1
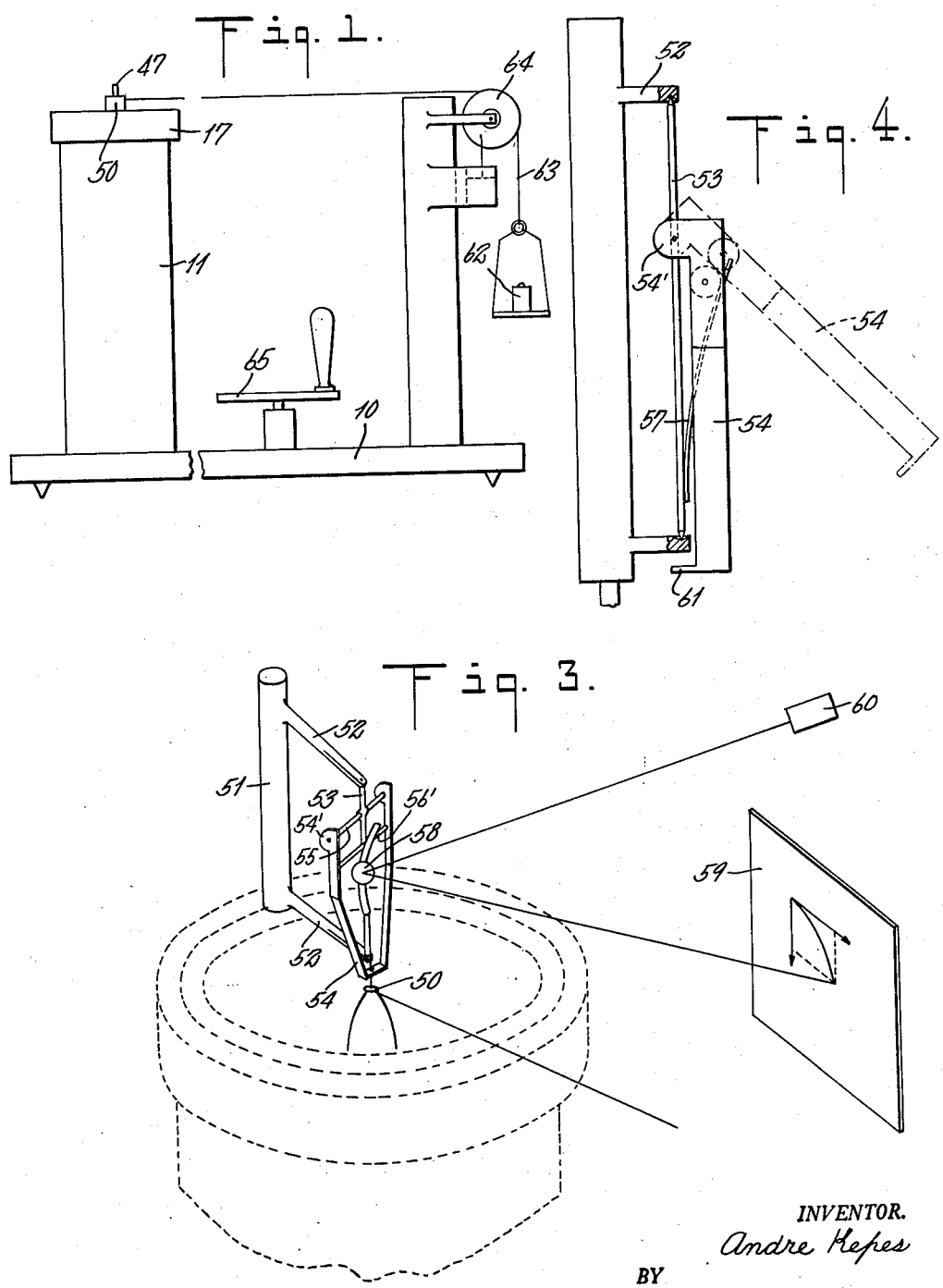
INVENTOR.
Andre Kepes
BY
Dale A. Bauer
ATTORNEY

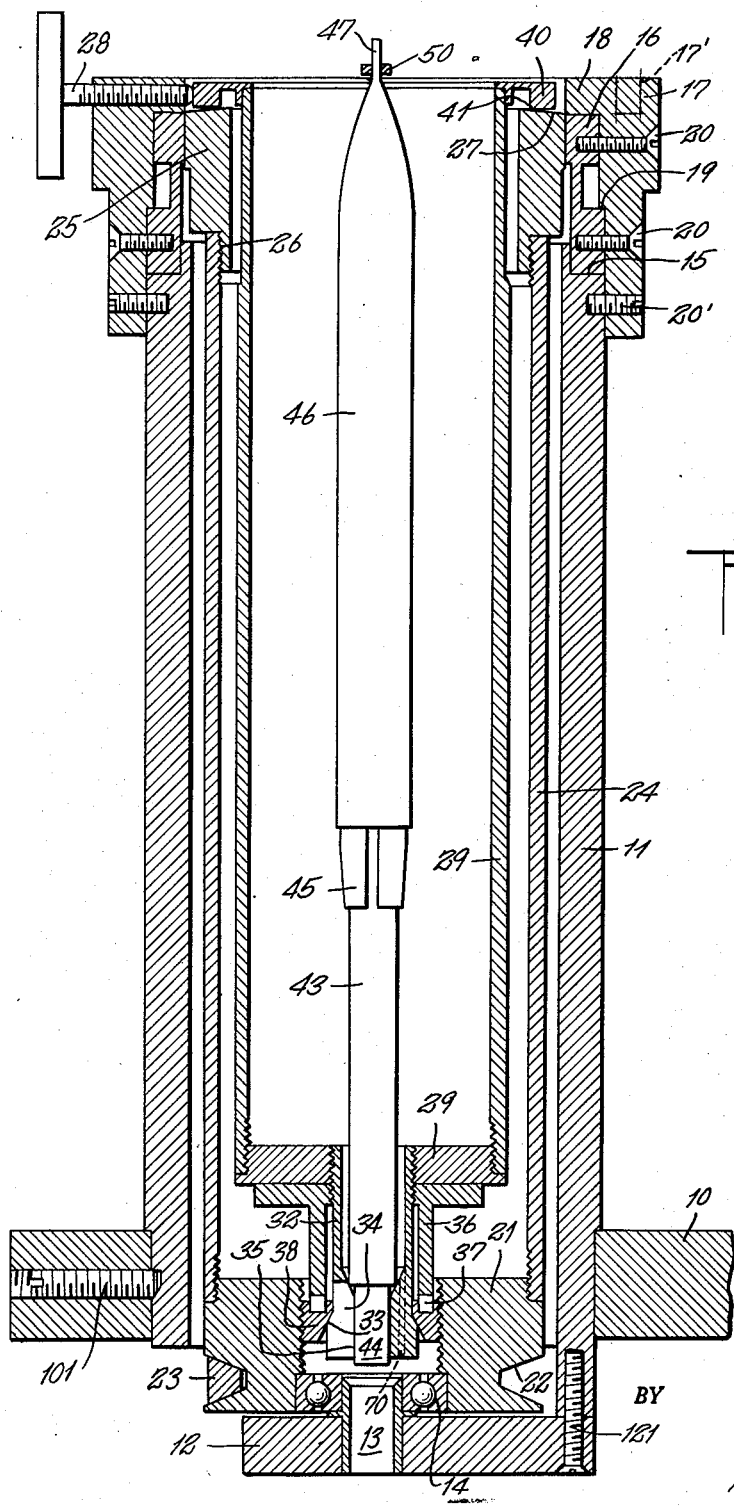

Oct. 21, 1952     A. KEPES     2,614,415
TESTING APPARATUS FOR THE MEASUREMENT OF THE
INTERNAL PHYSICAL PROPERTIES OF SOLIDS
Filed Dec. 1, 1949     4 Sheets-Sheet 3

INVENTOR.
Andre Kepes
BY
Dale A. Bauer
ATTORNEY

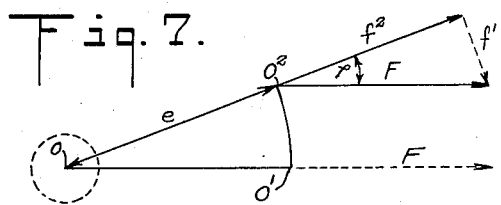
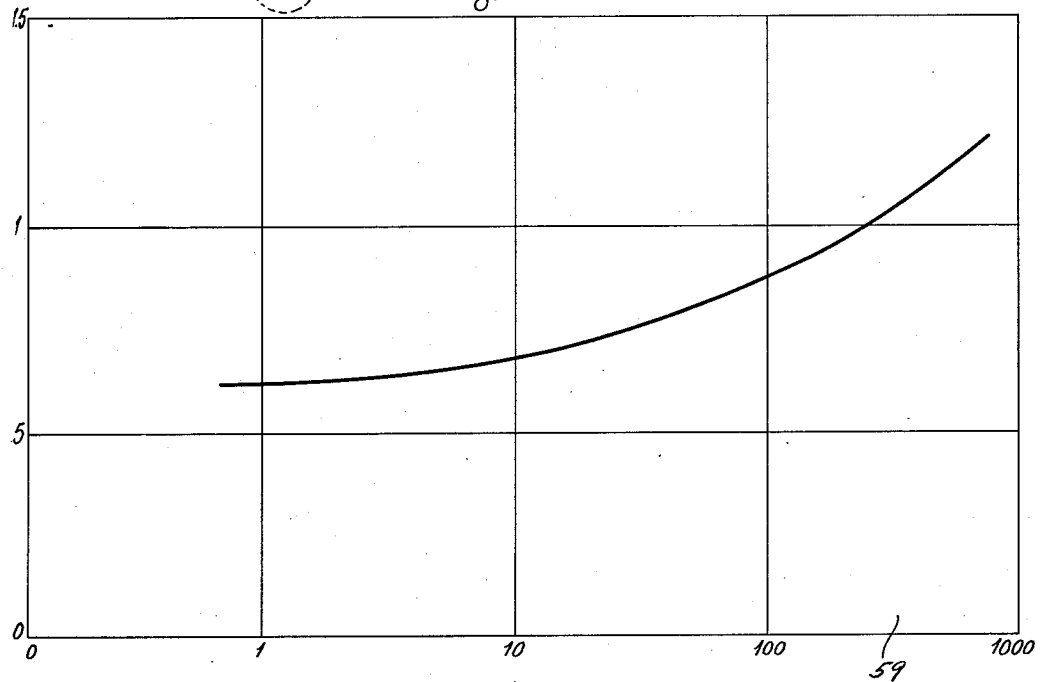
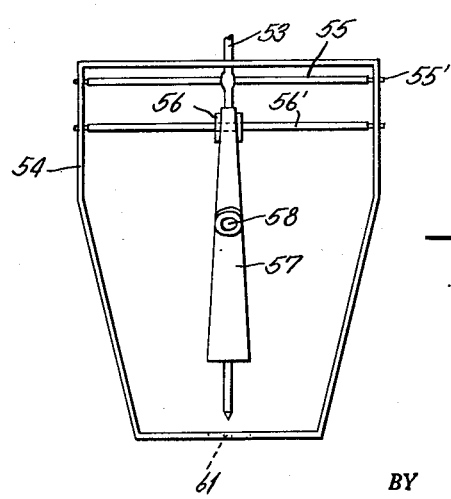
INVENTOR.
Andre Kepes
BY
Dale A. Bauer
ATTORNEY

Patented Oct. 21, 1952

2,614,415

UNITED STATES PATENT OFFICE 2,614,415

TESTING APPARATUS FOR THE MEASUREMENT OF THE INTERNAL PHYSICAL PROPERTIES OF SOLIDS

André Kepes, Saint-Mandé, France, assignor to Societe Anonyme des Manufactures des Glases et Produits Chimiques de Saint-Gobain, Chauny & Cirey, Paris, France Application December 1, 1949, Serial No. 130,557
In France January 10, 1949

7 Claims. (Cl. 73—100)

This invention relates to an apparatus for testing the physical properties of solids particularly the coefficient of internal friction and the modulus of elasticity of such solids.

In 1923, Mason conceived the idea of measuring the coefficient of internal friction of a rod by rotating it with one end deflected by lateral tension, the composite deflection of the end of the piece by tension and rotation being taken as the measure of the coefficient. The practice of that theory has never been satisfactory because of a multitude of difficulties which introduced errors of great magnitude, and even of principle. For example, this invention has demonstrated that the coefficient $k$ is not independent of the frequencies but varies as a function of the frequency and according to laws which are variable from one material to another, which is contrary to the former theory.

It is an object of this invention to test the physical properties of solids simply, quickly, and accurately, and to extend the tests into ranges of frequencies which have not heretofore been available.

Another object of the invention is to construct an apparatus capable of testing physical properties of solids accurately, speedily, and throughout ranges of frequencies not heretofore available with prior apparatus.

Another object of the invention is to measure the deflection of test pieces more accurately.

Another object of the invention is to construct apparatus capable of recording the deflection of test pieces more accurately and through a wider range than has heretofore been possible.

In the reduction of the concepts of the invention to practice dependent inventions were made in order to overcome various problems which had not been solved by the prior art and which required solution if the major invention was to be completely successful. These dependent inventions will be described elsewhere in the specification.

In the accompanying drawings there is set forth a representation of a preferred form of the novel apparatus.

Figure 1 is an elevational view of the exterior of the apparatus.

Fig. 2 is a vertical sectional view through the apparatus which operates upon the test piece.

Fig. 3 is a diagrammatic perspective view of the apparatus which measures the deflection and the physical properties of the test piece.

Fig. 4 is a side view of the apparatus shown in Fig. 3.

Fig. 7 is a vector diagram of the mathematical principles involved in the invention.

Fig. 8 is a graph of a test made by the apparatus on a rod of polyvinylidene chloride.

Fig. 9 is a front view of the universal frame.

Figure 5:
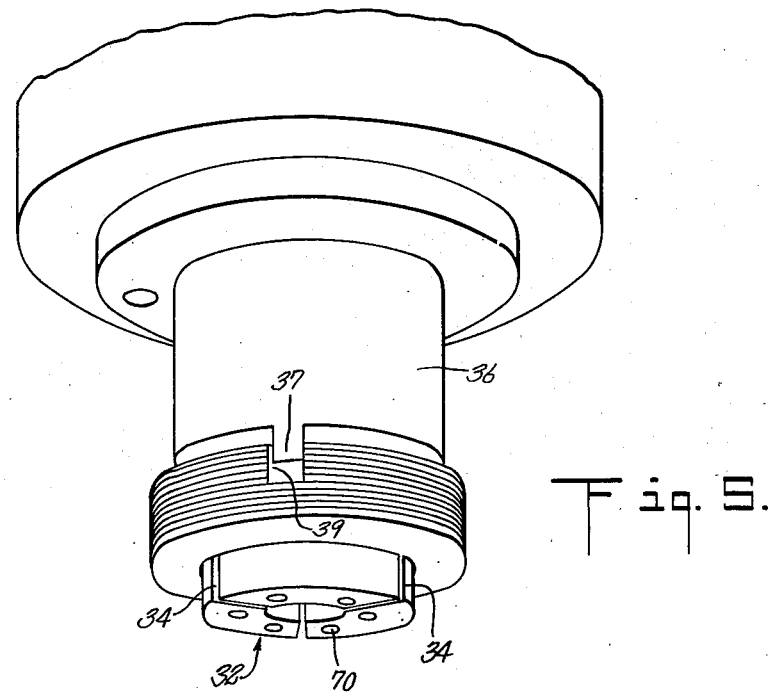
Fig. 5 is a detail of the gripping and driving construction of the apparatus.
Figure 6:
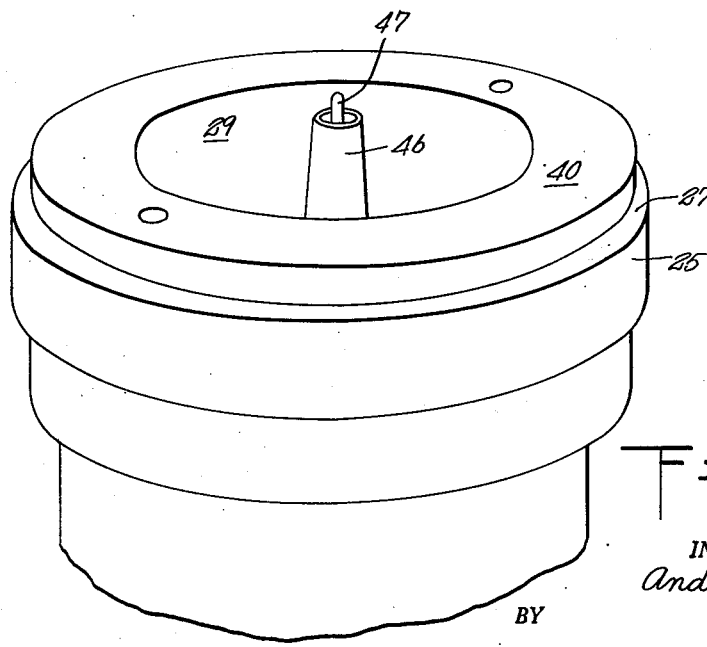
Fig. 6 is a perspective detail of the top of the rotor.

Looking now at Fig. 1, the numeral 10 refers to a base upon which is mounted a tubular frame 11, above which projects a pin 47 which is mounted on the end of a test piece that is inside cylinder 11. Lateral tension is applied to the pin 47 by a weight 62 and a cord 63 which is trained over a pulley 64 and bears upon the pin 47 through an anti-friction bearing 50. A hand wheel 65 diagrammatically illustrates means for rotating the test piece inside the tubular frame 11 by means of an appropriate drive, concealed in the base 10.

In practice, the drive will preferably be by mechanical or electrical means having a wide range of speed; a tachometer will be employed to measure the R. P. M. at the moment of taking a reading. Means of coupling tachometers to rotating bodies, and means for rotating bodies at selected speeds, are well known and do not form part of the invention.

In Fig. 1, the apparatus for measuring the deflection of the pin 47 is not shown and reference must be had to Figure 3 for that part of the invention, which will be described hereinafter.

Referring now to Fig. 2, the base 10 supports the tubular frame 11 by means of a small flange, which rests upon the base 10, and a set screw 101 which operates on a cam principle, securing the flange tightly against the face and the frame firmly in place. At the top of the frame 11, an annular groove 15 is provided, having a right section, and in that groove is mounted an anti-friction bearing 16. This bearing is itself attached by screws 20 to cap ring 17 which is in turn attached to frame 11 by screws 20'. The cap ring 17 has a flange 18, which engages the top of bearing 16, and an internal land 19 which bears upon a cooperating land of the bearing.

The tubular frame 11 carries at its lower end a removable bearing support 12 which is held on the frame 11 by screws 121 located conveniently. A tubular bearing stud 13 is mounted in the support 12 and projects upwardly beyond the support, serving as a supporting core for the ball bearing 14 and as a port for the admission of fluids, such as air of selected temperature, which can be admitted to flow about the test piece and vary its temperature during testing.

A cylinder end block 21, having an internally screw threaded central bore is mounted upon the bearing 14, is provided with a groove 22 in which a drive belt 23 is trained and imparts rotation to the cylinder 24 from any selected source of power. A cylinder 24 is mounted on the block 21, in this instance by screw threads, and has at its upper end a bearing 25 which engages the circular bearing 16. Bearings 14, 16 and 25 are, of course, coaxial so that the rotatable cylinder 24 is coaxial with the frame 11 and can be operated therein at any selected speed.

In order to carry out the purposes of the invention, a test piece is mounted in this rotatable cylinder 24. The mechanism by which the test piece is mounted in the rotatable cylinder 24 forms part of the invention and permits the alignment of the test piece upon a true axis so that it also is coaxial with the frame 11, cylinder 24, and bearings 14 and 25 during operation.

The test piece itself is preferably a carefully machined rod 43 which is true to its axis. As shown in the drawing, it has a reduced end 44 which is held in a vise-like grip by the split end of sleeve 32, which is of comparatively thin and solid construction at its top and of massive construction at its base, having slots 34 extending radially upward for a distance sufficient to lend flexibility to the sections between the slots, and having a center bore of approximately the same diameter as the reduced end 44 of the test piece 43.

The external wall of the split sleeve 32 has a conical shoulder 33 opposite the gripping portions of the sleeve for the purpose of applying gripping action by the sections to the end of the test piece.

Mounted in the screw threaded bore of end block 21 is a screw threaded ring 38 which has an internal cone which bears upon the conical shoulder 33 in the split sleeve so that the sleeve may be made to grip the test piece by turning the screw threaded ring 38, applying camming action against the gripping sections through the engaged faces of the cones.

Mounted upon the screw threaded upper end of the split sleeve 32 is a lug nut 36 which bears against a terminal shoulder in the solid end of sleeve 32 and has projecting lugs 37 which enter into driving sockets 39 in the screw threaded ring 38. The lugs fit the slot accurately in a circumferential direction but permit relative motion in an axial direction so that driving contact between the lug nut 36 and the cam ring 38 is maintained in various positions of the cam ring.

Also mounted upon the screw threaded end of split sleeve 32 is the adjustable test sample support 29 which is screw threaded on the sleeve 32 in tight locking engagement with the lug nut 36. By rotating the adjustable test sample support 29, the lug nut 36 screws the ring 38 against the sections of the split sleeve 32 and forces them to compress the sections against the end of the test piece. At the same time, the split sleeve is drawn downward and carries the test sample support 29 downward so that the flange 40, which projects outwardly from the top of the support 29, is brought into firm engagement with a spherical face 27 on the top of bearing 25. The flange 40 is provided with an annular edge 41 which engages the spherical surface and fixes the support 29 upon the rotating cylinder 24 so that in the operation of testing the two rotate as a single unit.

The carefully machined test piece 43 bears upon its end a tubular cap 46, of comparatively rigid material which does not interfere with true readings when subjected to tensions sufficient to produce deflection in the test piece 43. This cap is accurately set at a selected height upon the upper end of the test piece 43 by means of wedges 45, and it has at its end a projecting pin 47 which is cylindrical and serves as a bearing for a tiny ball bearing 50.

Even the most careful mounting of the cap 46 and of the test piece 43 may still leave an imperfection in the centering of the pin 47 on the axis of rotation of cylinder 24, so an adjustment is provided whereby the axis of the pin may be perfectly aligned upon the axis of the cylinder.

A screw 28 is mounted in the cap ring 17 and bears upon the side of flange 40. In centering the pin 47, the hand wheel 65 is rotated slowly and a reading is taken, by the apparatus hereafter described, to see if the pin is centered. If it shows a deflection, the screw 28 is used to move the flange 40 of support 29 slightly over the spherical surface 27. Further rotation of the cylinder 24 may disclose other aberrations, which are in turn corrected by the screw 28 until further rotation shows no deflection through a full turn of the cylinder 29. Alignment having thus been secured, the apparatus is ready for the test.

In the cap piece 17 are some holes 17' which may receive post 51, as shown in Figures 3, 4 and 2, having radial arms 52 with opposed bearings for pivot pin 53. The length of the arms brings the pivots in posts 53 into alignment with the axis of the cylinder hereinbefore referred to. A bar 55 projects laterally from the pivot pin 53, to which it is affixed, and supports the frame 54 on horizontal pivots 55' in projecting ears 54'. By this construction, the frame 54 is given universal movement, turning horizontally with rod 53 and vertically about bar 55. A lug 61 projects horizontally from the frame 54 and is provided with a vertical aperture and a bearing which receives the pin 47 of the cap 46, above the bearing 50. A spring 57 is welded at its lower end to the rod 53 and bears against roller 56 which is mounted on a rod 56' which is pivoted at its ends in the frame 54 as shown in Figure 9. Attached to the spring 57 is a mirror 58 upon which a beam of light is directed from the source 60, the beam being reflected to a graph 59. When tension is applied by cord 63 to bearing 50 and pin 47 the test piece is deflected in the direction of the pull, and when the cylinder is rotated the test piece is rotated and causes a lateral or circumferential deflection.

The mathematical principles upon which the apparatus works are explained in connection with Fig. 7. In this figure, O represents the position of the axis of pin 47 when no force is applied to it. $O'$ is the new position of this point when the force F is applied to it (by cord 63) without rotation of the test piece. When the test piece is rotated counterclockwise around its axis the force F conserves the same direction but the rotation moves the axis of the pin from the position $O'$ to $O^2$. The speed of rotation being maintained constant the pin will find a position of equilibrium at $O^2$. The force F applied at $O^2$ may be divided into its components $f'$ and $f^2$. The component $f' = F \sin \varphi$ works to return the point $O^2$ to $O'$ and thus works against the forces of internal friction. As $O^2$ is a position of equilibrium the component $f'$ is equal and opposite to the forces of internal friction. As to the component $f^2 = F \cos \varphi$, it is equal and opposite to the forces of elasticity developed in the test piece by the flexion.

The forces of internal friction $(-f')$ are proportional to the forces of elasticity $(-f^2)$ and on the other hand to the coefficient of internal friction $k$, this by the definition itself of that coefficient.

Thus one can write:

$$(1) \qquad f' = \frac{1}{K} \cdot f^2 \cdot k$$

$\frac{1}{K}$ being a certain constant.

Thus $$k = K \cdot \frac{f'}{f^2} = K \cdot \frac{\sin \varphi}{\cos \varphi} = K \cdot (\tan) \varphi$$

Theory shows that $K = 2\pi$ and thus $k = 2\pi \tan \varphi$.

For small angles one may assimilate the angle with its tangent and thus one may assume $k$ to be $2\pi\varphi$.

It is therefore seen that in practice the measure of the coefficient of internal friction $k$ is reduced to a measurement of the angle $\varphi$.

As to the component $f^2 = F \cos \varphi$, it is this force which imposes on the test piece the arrow $OO^2 = e$ permitting one to measure the modulus of elasticity $E$ by the formula:

$$(2) \qquad E = \frac{L^3 F \cos \varphi}{3 I e}$$

the arrow $e = OO^2$ in accordance with formula 2.

In this formula I is the moment of inertia of the section of the test piece around an axis situated in its plane and L is the length of the test piece.

$$I = \frac{\pi d^4}{64}$$

in the case of one cylindrical test piece of which $d$ is the diameter.

Thus knowing the force F and the angle $\varphi$, the modulus of elasticity is given by measuring the arrow $e = OO^2$ in accordance with Formula 2.

It is therefore seen, that in practice the measure of the coefficient of internal friction is reduced to a measurement of the angle $\varphi$ and, furthermore, knowing the force F and the angle $\varphi$ the modulus of elasticity is given by measuring the arrow $e = OO^2$ in accordance with Formula 2.

The following principles are characteristic of this invention. The test piece, vertically aligned, is mounted in a tubular shaft by attachment of one end at the base, and is rotated, rotation being carried out after adjustment of the piece upon the geometric axis of the said tubular shaft has been accomplished.

A tubular casing is placed between the test piece and the rotating cylinder, and coaxial with it, performing the double function of mounting the test pieces solidly in the rotating cylinder at their lower ends, and of permitting the alignment of the upper end of the test piece on the said geometric axis.

In a preferred form of the invention the apparatus presents the following features: the rotation of the rotating cylinder or tubular shaft is carried out in bearings of which two are fitted in the upper part of the apparatus, and are machined with such precision that they turn with respect to each other without lubrication, whereas the lower bearing for the cylinder may be a ball bearing; the upper part of the test sample support is provided with means for alignment susceptible of being moved spherically with respect to the said machined bearing and of which the center is fittted at the base of the test sample support, so as to permit alignment of the end of the test piece cap by radial displacement; the lower part of the test piece is seized in the base of the test piece holder by means of a slotted sleeve which can be clamped upon it, the clamping action being obtained by means of an internally conical nut which acts upon an external cone upon the sectors of the test piece support.

In a modification of the invention, the cap piece 46 is omitted and the test piece 43 is formed at its end with a bearing pin, comparable to pin 47, upon which the bearing 50 rides and to which the stress of the cord is applied.

In carrying out the invention, the apparatus is dismantled, leaving only the tubular frame 11 mounted on the base 10, and the cap 46 is mounted by wedges 45 on the cylinder test piece 43 which is described for purposes of illustration as being made of vinylidine chloride. The nut 36 is screwed down on to the split sleeve 32 as far as it will go, as shown in Figure 2, and the test sample support is screwed down on top of it. The test piece 43 is now mounted by its end 44 in the split base of the sleeve 32, the ring 38 being in place, but of course, not exercising camming action on the cone of the split base. Now, the assembled test piece and test piece support are inserted in the top of the cylinder 24 until the screw 38 engages the threads of the end block 21, and a few turns are given to set the threads. The rotatable cylinder 24 is then slid into the tubular frame 11 until the end block is seated upon the roller bearing 14 and the upper bearing 25 is fitted in the bearing 16 with a fit so perfectly machined that lubrication is unnecessary. A few turns on the end block 21 serves to set the flange 40 and clamp the test piece in the sectors of the split sleeve 32. The screw 28, which has been retracted during the seating of the bearings, is now screwed in and final adjustment is made of the pin 47 on the axis of the apparatus. This having been accomplished, the screw 28 is retracted again and the apparatus is ready for operation.

If it is desired to carry out the tests at a temperature other than at atmospheric, a gas of the requisite temperature is blown through hollow stud 13 and holes 70 in the split sleeve so that the test piece is surrounded by a fluid at the desired temperature.

The test piece having been properly centered, the mirror is mounted on the tubular frame 11 as shown in Figure 3 and the bearing in the lower end of frame 54 is set on the pin 47. A zero point is established on the chart 59. The location of the zero point is accomplished by turning the apparatus and observing the light spot on the chart. If it wavers, the pin 53 is not properly centered, but a minor adjustment corrects this so that the light does not waver on the chart as the shaft is turned; this constitutes the zero point. The test piece is now rotated, for instance, at 1,000 R. P. M. and a tension, for instance of 250 grams is applied little by little to its end so that the light spot is slowly displaced. After several seconds, the total tension having been applied, it assumes a position the coordinate of which is noted, for example, 76 mm. vertically and 55 mm. horizontally. The operation is repeated for decreasing speeds for example, 350, 100, 35, 10, 5, 3, and 1 R. P. M. and at each speed the coordinates corresponding to the position of the point of light are noted on the graph. From the horizontal coordinate, the angle theta is immediately deduced which permits one to obtain the coefficient $k$ of internal friction. From the vertical coordinate, one derives the arrow $e$ which permits the calculation of the modulus of elasticity of the test piece by the formula hereinabove given where no cap is employed on the test piece, and by the formula that follows when a cap is used;

$$E = \frac{(L^3 - D^3)}{3Ie} F \cos\text{theta}$$

*Example*

At 15° C. a perfect cylinder of polyvinylidene chloride was prepared and mounted as shown in Figure 3 and a 250 gram weight was loaded at 62, a brake being applied to the pulley 64 so that no tension reached the pin on the end of the cap. The test piece was then rotated at 1000 R. P. M. and the weight was released progressively until full tension was applied to the cap pin. After several seconds, the beam of light fixed itself on the graph, a reading was taken, and successive speed reductions to 850 R. P. M., 86 R. P. M., 38 R. P. M., 4.4 R. P. M. and .8 R. P. M. were made, the positions of the beam of light being marked on the graph at each speed. These curves show that the coefficient of internal friction $k$, is a function of the R. P. M., which is to say a function of the frequency of the vibrations imposed on the test piece.

Many other tests have been carried out with different materials quickly, and with extremely accurate results. Tests by variation of weight at constant speed have been successfully completed.

The apparatus can be employed to determine the coefficient of friction between two solids constituted by different materials. For this purpose, the ball bearing 50 is replaced by a cylinder ring of the first material which is made to rotate with the cap. This apparatus being in rotation, one may bring progressively toward this ring, a test piece of the second material. The said ring tends, at the moment of contact, to roll, without sliding, on this test piece and to occupy a position of equilibrium at which relative sliding motion commences and which is a function of the coefficient of friction between the two solids. This displacement is registered as in the other cases by the mirror of the measuring unit. The angles through which the mirror has turned is a function of the coefficient of friction.

The new method and apparatus can also be applied to the measurement of the coefficient of friction between two objects made of the same material or two objects made of different materials.

The principle employed in the invention is of continuous rotation and not the pendulum movement employed in certain prior art concepts. The vertical position of the test piece is a feature of some importance, as it eliminates errors found in prior art attempts to employ the earlier and more primitive principle of Mason. The construction of the novel apparatus permits the centering of the test piece precisely on the axis of the apparatus, thus eliminating another series of imperfections, particularly to those sorts which arise from the influence of gravity.

The principle of multiplying the movements or deflections of the test pieces makes it possible to use comparatively small deflections and to eliminate the use of long test pieces which might not be homogeneous in all their parts and which would consequently have errors arising from the lack of homogeneity.

The measurement of the coefficient of internal friction and of the modulus of elasticity is made simultaneously by the simple observation of a luminous spot.

As many apparently widely different embodiments of the present invention may be made without departing from the spirit and scope thereon, it is to be understood that the invention is not limited to the specific embodiments.

I claim:

1. Testing apparatus including a vertical frame, a cylinder rotatably supported in said frame and having an upper face, a testing rod holder connected at the lower end to said cylinder and having universally adjustable engagement with said face, a cap constructed and arranged to grip a test rod held by the holder, and bearing means for connecting tensioning apparatus to said cap.

2. Testing apparatus including a vertical frame, a bearing supported by the lower end of the frame, a coaxial bearing supported by the upper end of the frame, a coaxial cylinder rotatably supported by said bearings and having an upper spherical face, driving means for rotating said cylinder, a test piece holder held at the lower end by said cylinder and having universally adjustable contact with said spherical face, a tubular cap constructed and arranged to grip a test piece held by said test piece holder, tension means connected to said cap to warp the test piece, and movably mounted measuring means operatively connected to the cap for deflection by said cap during rotation of the test piece under tension.

3. Testing apparatus including a base, a vertical frame secured to the base, a bearing removably supported by the lower end of the frame, a coaxial bearing supported by the upper end of the frame, a coaxial cylinder rotatably supported by said bearings and having an upper spherical face, an internally screw threaded end block engaging the lower bearing and provided with driving means, an internally conical nut engaged with the screw threads of the end block, a sleeve split at one end to form a grip for a test rod, threaded at the other end and having an external cone about the split engaged with the cone of the said nut, a cylinder having an end mounted on said sleeve and a flange at the other end movable into fixed contact with the said spherical face and driving means connecting the end block and the cylinder.

4. Testing apparatus including a base, a vertical frame secured to the base, a bearing removably supported by the lower end of the frame, a coaxial bearing supported by the upper end of the frame, a coaxial cylinder rotatably supported by said bearings and having an upper spherical face, an internally screw threaded end block engaging the lower bearing and provided with driving means, an internally conical nut engaged with the screw threads of the end block, a sleeve split at one end to form a grip for a test rod, threaded at the other end and having an external cone about the split engaged with the cone of the said nut, a cylinder having an end mounted on said sleeve and a flange at the other end movable into fixed contact with the said spherical face, driving means connecting the end block and the cylinder, a tubular cap constructed and arranged to grip a test rod held by the split sleeve, tension means connected to said cap constructed and aligned to warp the test rod, a mirror universally mounted on the frame and constructed and arranged to be moved by said cap, a light source trained on said mirror, and means to measure the deflection of the light from said mirror.

5. Testing apparatus including a base, a vertical frame secured to the base, a bearing removably supported by the lower end of the frame, a coaxial bearing supported by the upper end of the frame, a coaxial cylinder rotatably supported by said bearing and having an upper spherical face, an internally screw threaded end block engaging the lower bearing and provided with driving means, an internally conical nut engaged with the screw threads of the end block and having sockets in the upper part, a sleeve split shaped at one end to form a grip for a test rod, threaded at the other end, and having an external cone, about the split end, engaged with the cone of the said nut, a lug nut mounted on the threaded end of the said sleeve having driving lugs engaged with said sockets, a cylinder having an end screw threaded on said sleeve and a flange, at the other end, movable into fixed contact with the said spherical face, an adjusting screw mounted on said frame and bearing on the said flange, a tubular cap constructed and arranged to grip the test rod, tension means connected to the pin and aligned to warp the test rod, a mirror universally mounted on the frame and constructed and arranged to be moved by said cap, a light source trained on said mirror, and a graph receiving the beam reflected from said mirror.

6. Testing apparatus including a base, a vertical tubular frame secured to the base, a bearing support removably attached to the lower end of the frame, an annular stud extending through the support coaxially of the tubular frame, a bearing about the stud, a coaxial bearing supported by the upper end of the tubular frame, a coaxial cylinder, rotatably supported by said stud bearing, engaged by said upper bearing, and provided with a spherical face, an internal screw threaded end block engaging the lower bearing and provided with driving means, an internally conical nut engaged with the screw threads of the end block and having sockets in the upper part, a sleeve split at one end and threaded at the other end, adapted to grip one end of a test rod and having an external cone about the split end engaged with the cone of the nut, a lug nut mounted on the threaded end of the said sleeve having driving lugs engaged with said sockets, a cylinder having an end screw threaded on said sleeve and a flange, at the other end, held in fixed contact with the said spherical face, an adjusting screw mounted on said frame and bearing on the said flange, a tubular cap seated on the test rod and provided with a projecting pin, a bearing about said pin, tension means connected to the bearing on the pin and aligned to warp the test rod, a post mounted on the said tubular frame, a mirror universally mounted on the post and constructed and arranged to be moved by said pin, a light source trained on said mirror, and a graph receiving the beam reflected from said mirror.

7. Testing apparatus including a vertical frame, a cylinder rotatably supported in said frame and having an upper face, a testing rod holder connected at the lower end to said cylinder and having univerally adjustable engagement with said face, and tension means including a collar adapted to apply lateral tension to a test rod mounted in said holder.

ANDRÉ KEPES.

REFERENCES CITED

The following references are of record in the file of this patent:

UNITED STATES PATENTS

| Number | Name | Date |
| --- | --- | --- |
| 1,193,686 | Heisler | Aug. 8, 1916 |
| 1,667,401 | Stockmeyer | Apr. 24, 1928 |
| 2,065,365 | Doyle et al. | Dec. 22, 1936 |
| 2,290,868 | Eriksson | July 28, 1942 |
| 2,313,923 | Chubb | Mar. 16, 1943 |
| 2,360,053 | Gibbs | Oct. 10, 1944 |

FOREIGN PATENTS

| Number | Country | Date |
| --- | --- | --- |
| 530,418 | Great Britain | Dec. 11, 1940 |
| 598,510 | Great Britain | Feb. 19, 1948 |
| 679,588 | Germany | Aug. 9, 1939 |
| 717,837 | Germany | Feb. 24, 1942 |
| 748,820 | France | Apr. 25, 1933 |